(12) United States Patent
Brun et al.

(10) Patent No.: US 12,546,625 B2
(45) Date of Patent: Feb. 10, 2026

(54) SYSTEM AND METHOD FOR PROVIDING DRIVER ASSISTANCE

(71) Applicant: Volvo Truck Corporation, Gothenburg (SE)

(72) Inventors: Arnaud Brun, Lyons (FR); Fanette Sevenier, Courzieu (FR)

(73) Assignee: Volvo Truck Corporation, Gothenburg (SE)

( * ) Notice: Subject to any disclaimer, the term of this patent is extended or adjusted under 35 U.S.C. 154(b) by 128 days.

(21) Appl. No.: 18/499,416

(22) Filed: Nov. 1, 2023

(65) Prior Publication Data

US 2024/0167841 A1  May 23, 2024

(30) Foreign Application Priority Data

Nov. 22, 2022  (EP) ..................................... 22208850

(51) Int. Cl.
*G01C 21/00* (2006.01)

(52) U.S. Cl.
CPC ..... *G01C 21/3815* (2020.08); *G01C 21/3885* (2020.08)

(58) Field of Classification Search
CPC ............ G01C 21/3815; G01C 21/3697; G01C 21/3885; B60K 2360/21; B60K 2360/334; B60K 35/22; B60K 35/285; B60K 2360/166; B60K 2360/167; B60K 2360/177; B60K 35/23; B60K 35/28; B62D 15/029; B60W 2300/14; B60W 2520/10; B60W 2520/14; B60W 2530/205; B60W 2540/18; B60W 2720/22; B60Y 2200/145; B60Y 2200/147
See application file for complete search history.

(56) References Cited

U.S. PATENT DOCUMENTS

2005/0125121 A1* 6/2005 Isaji ....................... G08G 1/165
                                                                    701/36
2007/0282532 A1* 12/2007 Yamamoto .......... B60R 21/0134
                                                                    701/96

(Continued)

FOREIGN PATENT DOCUMENTS

CN       102587237 A  *  7/2012
CN       102587237 B      12/2014

(Continued)

OTHER PUBLICATIONS

Ziajian Bai, Mar. 30, 2012, English Machine Translation_CN102587237A Provided by Patent Translate by EPO and Google (Year: 2012).*

(Continued)

*Primary Examiner* — Ashley L Redhead, Jr.
(74) *Attorney, Agent, or Firm* — Withrow & Terranova, PLLC

(57) ABSTRACT

A computer system is provided. The computer system comprises a processor device configured to receive map data representing characteristics of a road ahead of a vehicle, the vehicle having an actual vehicle width and an actual vehicle length; determine a maximum width of the vehicle based on at least the actual vehicle width and the map data; and provide visual information representing the maximum width to a driver of the vehicle.

18 Claims, 12 Drawing Sheets

(56) References Cited

U.S. PATENT DOCUMENTS

| | | | |
|---|---|---|---|
| 2010/0256852 A1* | 10/2010 | Mudalige | G08G 1/163 |
| | | | 701/24 |
| 2013/0116905 A1* | 5/2013 | Lucking | B60Q 9/006 |
| | | | 701/70 |
| 2016/0084942 A1* | 3/2016 | Mizutani | B60K 35/22 |
| | | | 701/96 |
| 2017/0247054 A1* | 8/2017 | Lee | |
| 2019/0050650 A1* | 2/2019 | Takaki | G06T 7/60 |
| 2021/0039715 A1* | 2/2021 | Ferrer | |
| 2021/0394760 A1* | 12/2021 | Mielenz | B60W 30/18154 |
| 2023/0103020 A1* | 3/2023 | Rohlfs | G06V 20/588 |
| | | | 701/23 |

FOREIGN PATENT DOCUMENTS

| | | | |
|---|---|---|---|
| EP | 2426034 A2 | 3/2012 | |
| WO | 9305492 A1 | 3/1993 | |
| WO | 2015178840 A1 | 11/2015 | |

OTHER PUBLICATIONS

Extended European Search Report for European Patent Application No. 22208850.2, mailed May 16, 2023, 7 pages.

\* cited by examiner

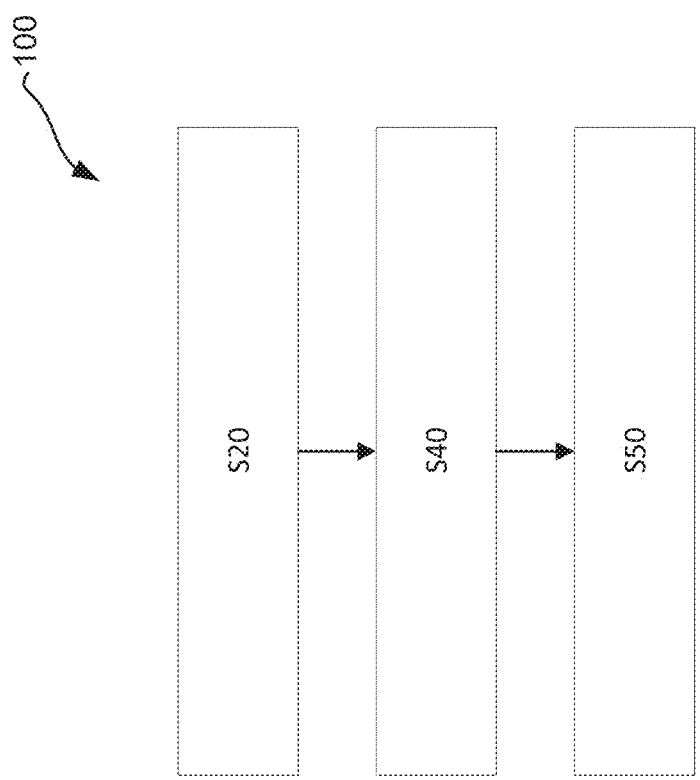

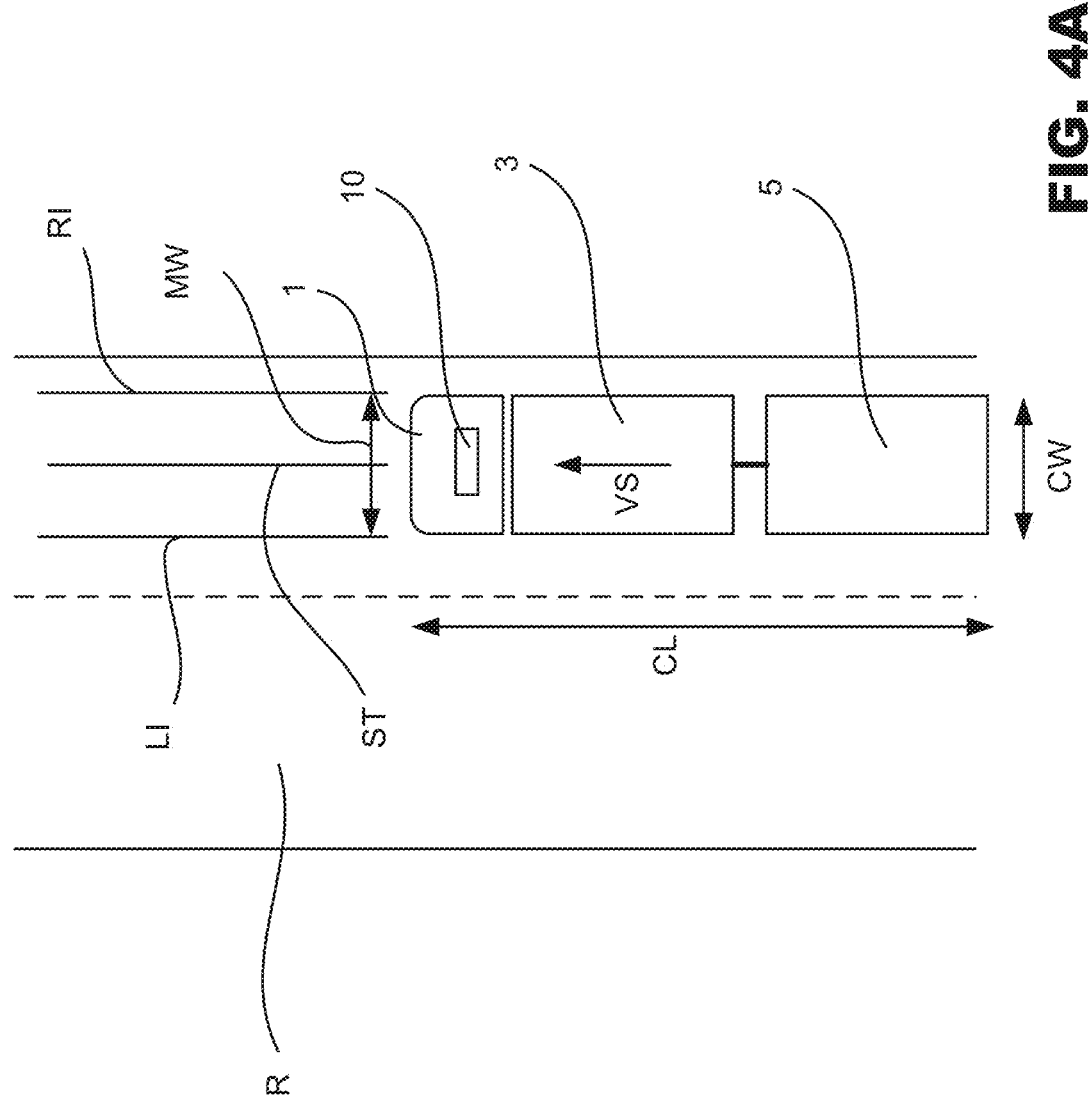

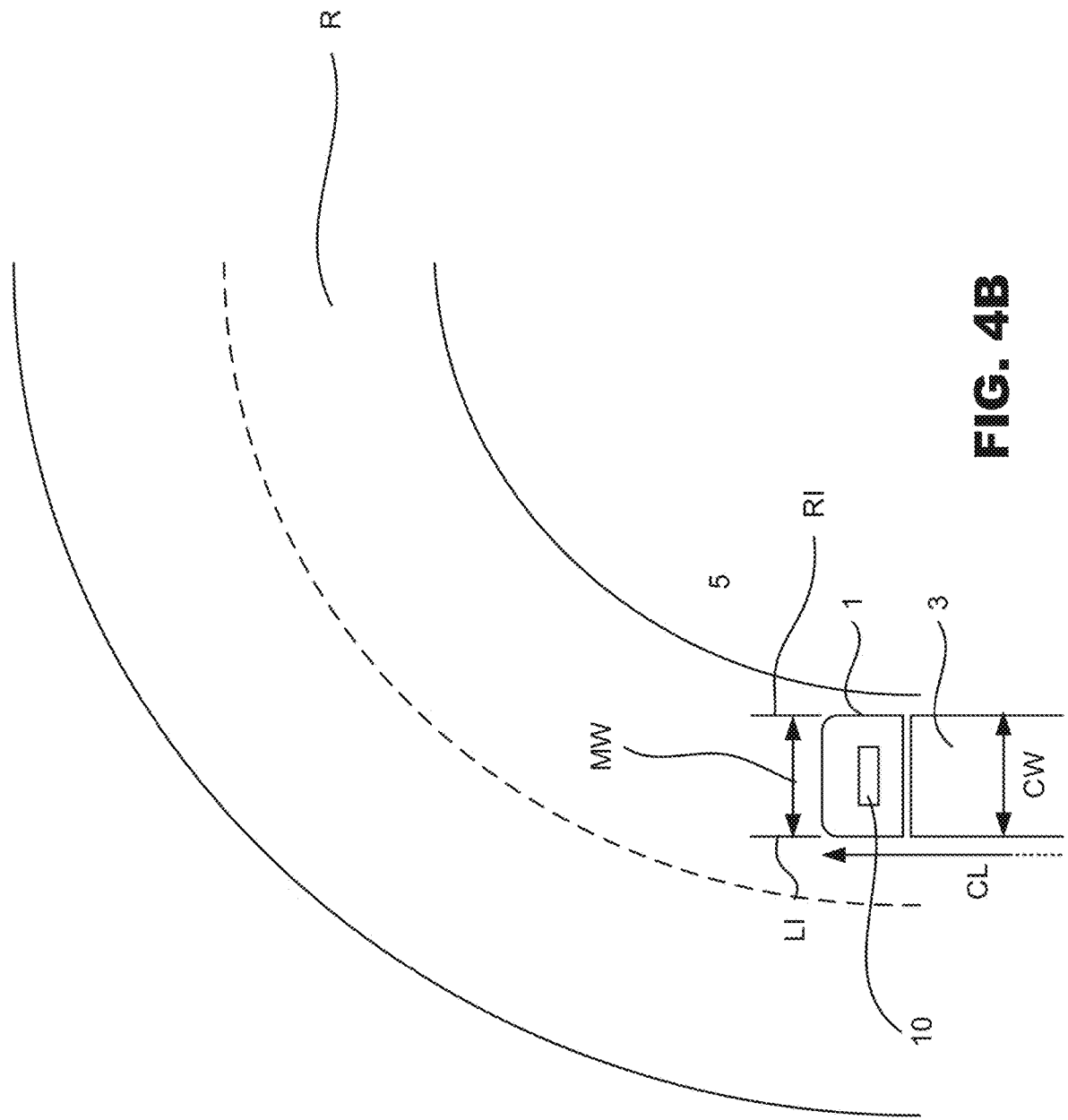

SYSTEM AND METHOD FOR PROVIDING DRIVER ASSISTANCE

RELATED APPLICATIONS

The present application claims priority to European Patent Application No. 22208850.2, filed on Nov. 22, 2022, and entitled "SYSTEM AND METHOD FOR PROVIDING DRIVER ASSISTANCE," which is incorporated herein by reference in its entirety.

TECHNICAL FIELD

The disclosure relates generally to vehicles. In particular aspects, the disclosure relates to systems and methods for providing driver assistance. The disclosure can be applied in heavy-duty vehicles, such as trucks, buses, and construction equipment. Although the disclosure may be described with respect to a particular vehicle, the disclosure is not restricted to any particular vehicle.

BACKGROUND

Advanced driver assistance systems (ADAS) are becoming increasingly popular. These systems are developed and implemented with the general purpose of increasing safety during driving of a vehicle, and typical examples of available ADAS include lane departure warning, adaptive cruise control, and various parking aids.

Some ADAS systems automatically determine and present a trajectory for a running vehicle. Such system may guide the driver to correctly position the vehicle on the road, especially in the lateral direction.

While it is beneficial to present a suggested trajectory, off-tracking may occur in some traffic situations. Off-tracking relates to a driving situation when the rearmost vehicle axle follows a path significantly different from the path of the front steering axle. Especially in narrow situations the suggested trajectory may be undesired as off-tracking may cause the vehicle to require another route to avoid collision.

There is a need for improved solutions which increase vehicle safety.

SUMMARY

According to a first aspect of the disclosure, a computer system is provided. The computer system comprises a processor device configured to: receive map data representing characteristics of a road ahead of a vehicle, the vehicle having an actual vehicle width and an actual vehicle length. The processor device is further configured to determine a maximum width of the vehicle based on at least the actual width and the map data, and to provide visual information representing the maximum width to a driver of the vehicle. The first aspect of the disclosure may seek to improve driving safety by indicating how the vehicle will behave along the road. A technical benefit may include a reduced risk for collision of the vehicle, especially in narrow traffic and during critical maneuvering situations.

According to a second aspect of the disclosure, a computer-implemented method is provided. The method comprises receiving, by the processor device, map data representing characteristics of a road ahead of the vehicle, the vehicle having an actual vehicle width and an actual vehicle length. The method further comprises determining, by the processor device, a maximum width of the vehicle based on at least the actual vehicle width and the map data, and providing, by the processor device, visual information representing the maximum width to a driver of the vehicle.

In some examples, the method further comprises determining a trajectory for the vehicle, and wherein the maximum width of the vehicle is determined based on the trajectory. A technical benefit may include additional improvements in driving safety, as the trajectory may be determined based on the traffic situations, and the visual information representing the maximum width will thus further guide the driver during potentially critical traffic situations.

In some examples, the method further comprises determining the maximum width of the vehicle as the maximum lateral extension of the vehicle along the trajectory. A technical benefit may include further improved safety, as the driver will be notified of the maximum lateral extension of the entire vehicle during maneuvering of the vehicle.

In some examples, the method further comprises providing visual information representing the trajectory to a driver of the vehicle. A technical benefit may include additional improvements in driving safety, as the trajectory will further guide the driver during potentially critical traffic situations.

In some examples, the trajectory and/or the maximum width of the vehicle is determined in real-time. A technical benefit may include improved driving safety, especially as the visual information representing the maximum width is updated with the current traffic situation.

In some examples, the method further comprises determining an actual vehicle speed, and wherein determining the trajectory and/or the maximum width is further based on the actual vehicle speed. A technical benefit may include a more accurate prediction of especially the maximum width, as the vehicle will move differently depending on the actual vehicle speed.

In some examples, the method further comprises capturing image data representing real-time characteristics of the road ahead of the vehicle, and determining the trajectory for the vehicle based on the image data. A technical benefit may include more accurate determination of the trajectory based on real conditions rather than map data only.

In some examples, the image data represents real-time information of the vehicle's position on the road, and determining the trajectory for the vehicle based on the image data. A technical benefit may include improved guiding of the driver, for example if the vehicle is positioned in a less optimal manner when approaching a turn.

In some examples, the method further comprises determining the maximum width of the vehicle and/or the trajectory based on a current steering wheel angle, a current trailer angle, and/or a current yaw rate. A technical benefit may include improved accuracy, as more real-time parameters are used.

In some examples, the method further comprises determining obstacle information from the image data, the obstacle information representing a presence of an obstacle on the road ahead of the vehicle, and determining the specific trajectory for the vehicle based on the obstacle information. A technical benefit may include reduced risk for collision, as the trajectory may be determined to avoid the obstacle.

In some examples, the method further comprises providing visual information representing the maximum width as a left indicator representing the left-most position of the vehicle, and a right indicator representing the right-most position of the vehicle. A technical benefit may include a clear guidance for the driver about the vehicle's outer boundaries when travelling ahead on the road.

In some examples, the method further comprises providing visual information representing the maximum width as a maximum width trajectory extending along the specific trajectory. A technical benefit may include increasing awareness to the driver as the maximum width is presented also for the road ahead of the vehicle.

In some examples, the method further comprises applying dynamic steering of the vehicle based on the specific trajectory. A technical benefit may include improving driving safety, as the dynamic steering, e.g., implemented by a forced feedback to the driver, will notify the driver if the vehicle is departing from the specific trajectory.

In some examples, the method further comprises presenting the visual information by projected lights on the ahead road, and/or on a vehicle head-up display. A technical benefit may include improved driver awareness, as the visual information is presented in the normal field of view of the driver.

According to a third aspect of the disclosure, a computer-implemented method is provided. The method comprises receiving, by the processor device, map data representing characteristics of a road ahead of the vehicle, the vehicle having an actual vehicle width and an actual vehicle length. The method further comprises determining, by the processor device, an actual vehicle speed and capturing image data representing real-time characteristics of the road ahead of the vehicle and real-time information of the vehicle's position on the road. The method also comprises determining, by the processor device, a trajectory for the vehicle in real-time based on the actual vehicle speed, the image data, and a current steering wheel angle, a current trailer angle, and/or a current yaw rate. The method further comprises determining, by the processor device, a maximum width of the vehicle in real-time based on at least the actual vehicle width, the map data, the trajectory, and a current steering wheel angle, a current trailer angle, and/or a current yaw rate, said maximum width of the vehicle represents the maximum lateral extension of the vehicle along the trajectory. The method further comprises providing, by the processor device, visual information representing the maximum width and the trajectory to a driver of the vehicle.

According to a fourth aspect of the disclosure, a vehicle is provided. The vehicle comprises the processor device to perform the method according to the second or third aspect.

According to a fifth aspect of the disclosure, a computer program product is provided. The computer program product comprises program code for performing, when executed by the processor device, the method according to the second or third aspect.

According to a sixth aspect of the disclosure, a control system is provided. The control system comprises one or more control units configured to perform the method according to the second or third aspect.

According to a seventh aspect of the disclosure, a non-transitory computer-readable storage medium is provided. The non-transitory computer-readable storage medium comprises instructions, which when executed by the processor device, cause the processor device to perform the method according to the second or third aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

FIG. 3A is a flow chart of an exemplary method to provide visual information in a vehicle according to one example.

FIG. 4A is a top view of an exemplary traffic situation for a vehicle according to an example.

FIGS. 4B and 4C are top views of an exemplary traffic situation for a vehicle according to different examples.

DETAILED DESCRIPTION

Aspects set forth below represent the necessary information to enable those skilled in the art to practice the disclosure.

The examples presented herein provide a solution to improve safety of running vehicles, in particular heavy duty vehicles such as trucks, etc. which are subject to significant off-tracking. By determining a maximum width of the vehicle for the road ahead of the vehicle, and presenting the maximum width to the driver, it is possible to predict a potential collision whereby the driver is allowed to react accordingly.

Figure 1:
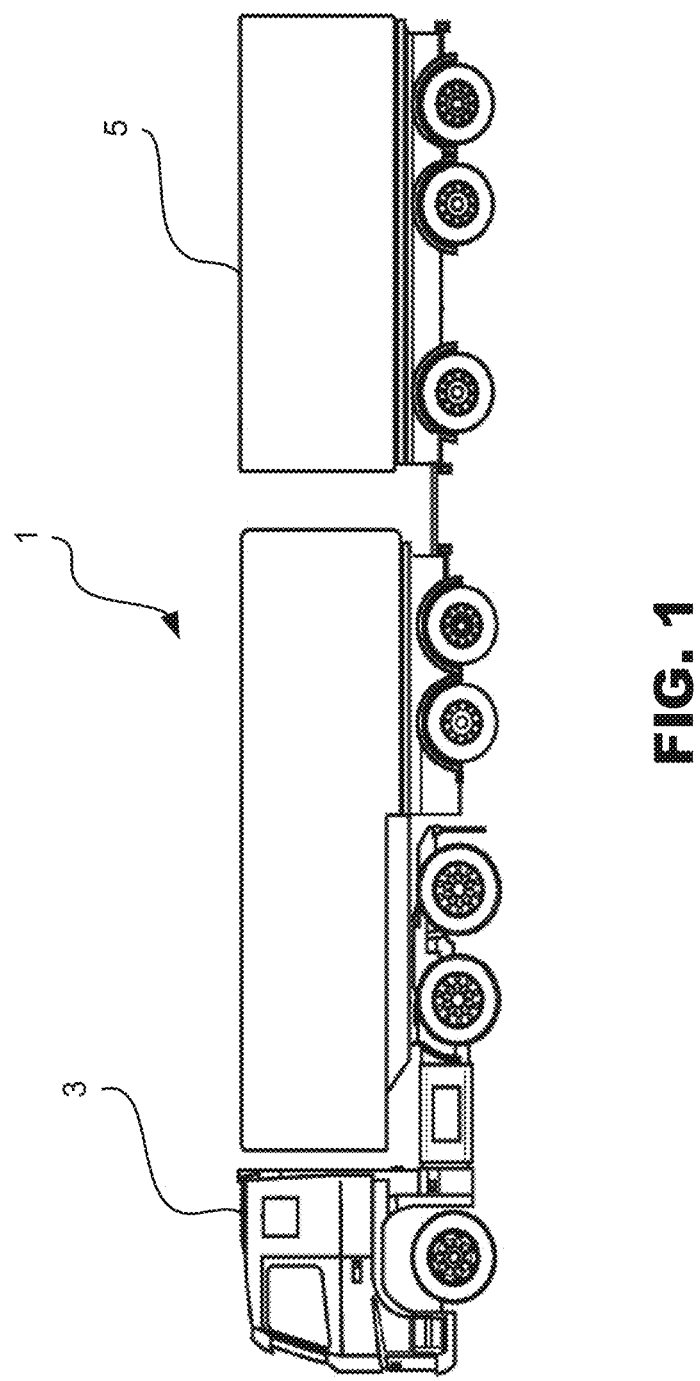
FIG. 1 is an exemplary side view of a vehicle according to one example.

FIG. 1 is an exemplary side view of a vehicle 1 according to one example. The vehicle 1, herein the form of a truck, may or may not be an articulated vehicle. The truck 1 comprises a tractor unit 3 and a trailer 5 being pulled by the tractor unit 3. The vehicle 1 is configured to present visual information representing the maximum vehicle width MW, as will be described further in the following.

Figure 2:
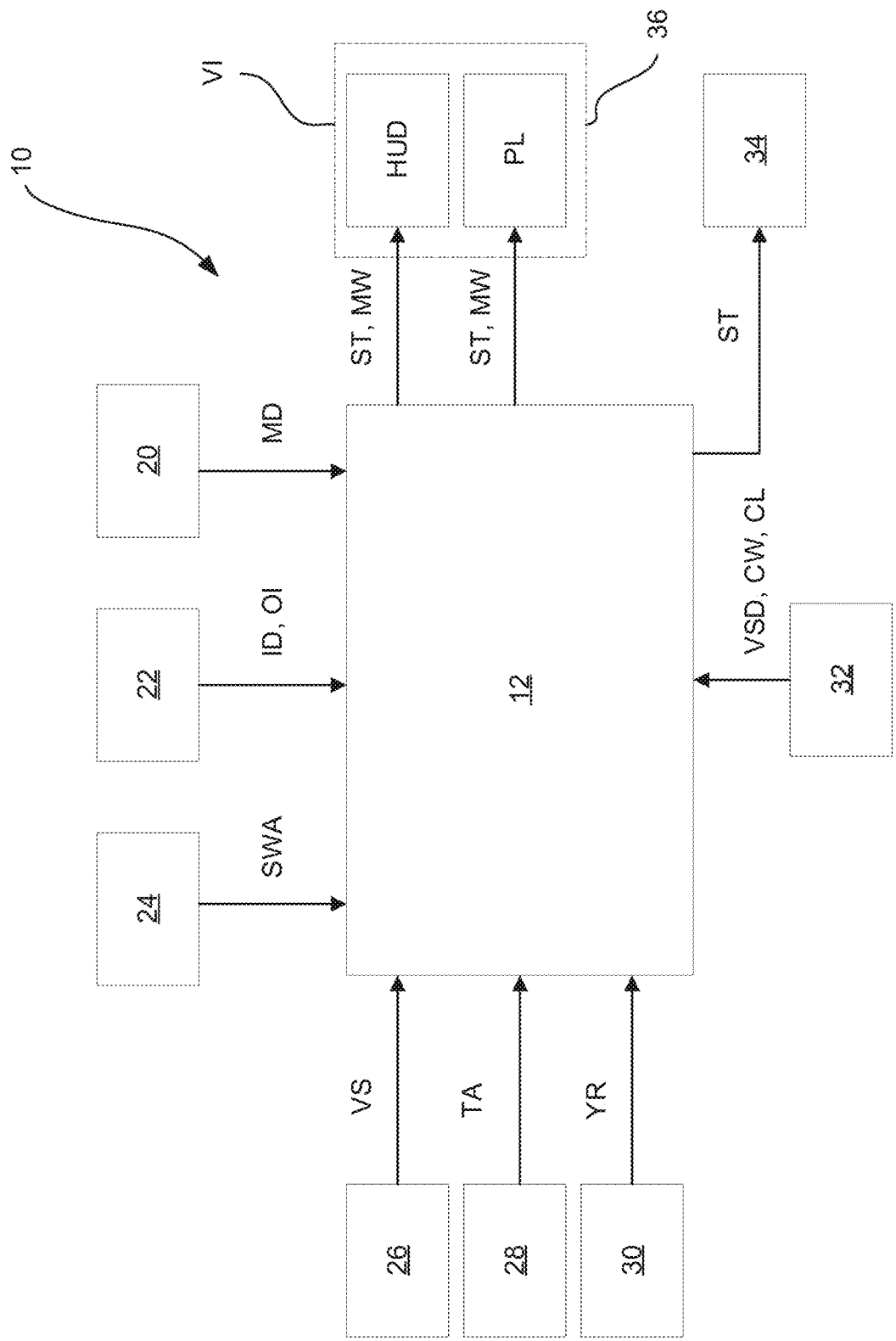
FIG. 2 is an exemplary system diagram of a vehicle according to an example.

FIG. 2 shows vehicle 1 in terms of a system diagram of a control system 10 representing the hardware architecture required for providing the visual information representing the maximum vehicle width MW.

The control system 10 comprises one or more control units 12. The one or more control units 12 is configured to receive data, and to process the data in order to determine the required vehicle characteristics. The one or more control units 12 may be implemented as a processor device 202, see FIG. 9.

The one or more control units 12 is in communication with a map data module 20. The map data module 20 is configured to communicate map data MD to the one or more control units 12. The map data MD may typically comprise information relating to the road ahead of the vehicle 1, such as road curvature, road width, and various dimensions of the road and surrounding buildings, etc. As the vehicle 1 is running, the map data MD is preferably updated in real time as the road ahead of the vehicle changes.

The one or more control units 12 is further in communication with a camera module 22. The camera module 22 is configured to communicate image data ID to the one or more control units 12. The image data ID may typically comprise real time characteristics of the road ahead of the vehicle 1 such as lines and trajectory, as well as real time characteristics of the position of the vehicle 1 on the road.

In an example, the one or more control units 12 is further configured to determine, preferably in real time, obstacle information OI from the image data ID. Optionally, such obstacle information OI may be provided directly, preferably in real time, from the camera module 22, as illustrated in FIG. 2. The obstacle information OI may comprise information representing a presence of an obstacle on the road ahead of the vehicle 1.

The one or more control units 12 is further in communication with a steering wheel angle sensor 24. The steering wheel angle sensor 24 is configured to communicate, preferably in real time, the actual steering wheel angle SWA to the one or more control units 12.

The one or more control units 12 is further in communication with a vehicle speed sensor 26. The vehicle speed sensor 26 is configured to communicate, preferably in real time, the actual vehicle speed VS to the one or more control units 12.

The one or more control units 12 is further in communication with a trailer angle sensor 28. The trailer angle sensor 28 is configured to communicate, preferably in real time, the actual trailer angle TA to the one or more control units 12.

The one or more control units 12 is further in communication with a yaw rate sensor 30. The yaw rate sensor 30 is configured to communicate, preferably in real time, the actual yaw rate YR to the one or more control units 12.

The one or more control units 12 is further in communication with a vehicle settings module 32. The vehicle settings module 32 is configured to store vehicle settings data VSD, and to communicate, preferably in real time, the vehicle settings data VSD to the one or more control units 12. The vehicle settings data VSD may, e.g., comprise information relating to fixed vehicle parameters such as vehicle length CL, tractor unit length, trailer length, fifth wheel position, vehicle width CW, tractor width, trailer width, tire dimensions, etc.

The one or more control units 12 is configured to process the received data and to determine a suggested trajectory ST for the vehicle 1 as well as a maximum width MW for the vehicle 1 when travelling along the suggested trajectory ST, as will be further described below. In particular, the maximum width MW of the vehicle is determined at least based on the actual vehicle width CW and the map data MD.

The suggested trajectory ST and the maximum width MW for the vehicle 1 are communicated by the one or more control units 12. As shown in FIG. 2 the suggested trajectory ST is communicated to an adaptive steering module 34. The adaptive steering module 34 may also receive real-time information about the actual course of the vehicle 1, for example by receiving the steering wheel angle SWA from the steering wheel angle sensor 24. If the actual course of the vehicle 1 departs from the suggested trajectory ST the adaptive steering module 34 may control a steering wheel feedback to the driver, thereby directing the driver to follow the suggested trajectory ST rather than choosing another route.

The suggested trajectory ST and the maximum width MW for the vehicle 1 are further communicated by the one or more control units 12 to a visual information module 36. The visual information module 36 is configured to present the suggested trajectory ST and the maximum width MW for the vehicle 1 as visual information VI to the driver, preferably in real-time.

The visual information module 36 may, e.g., comprise a head-up display HUD or an augmented reality display configured to display the visual information VI to the driver. Alternately, or in combination, the visual information module 36 comprise exterior lights configured to illuminate the road ahead of the vehicle 1 in a manner indicating the suggested trajectory ST and the maximum width MW for the vehicle 1.

FIG. 3A is a flow chart of a method 100 to provide visual information in a vehicle 1 according to one example. The method 100 comprises receiving S20, by a processor device 12, 202, map data MD representing characteristics of a road ahead of the vehicle 1. The vehicle 1 has an actual vehicle width CW and an actual vehicle length CL. The method 100 further comprises determining S40, by the processor device 12, 202, a maximum width MW of the vehicle 1 based on at least the actual vehicle width CW and the map data MD, and providing S50, by the processor device 12, 202, visual information VI representing the maximum width MW to a driver of the vehicle 1.

Figure 3B:
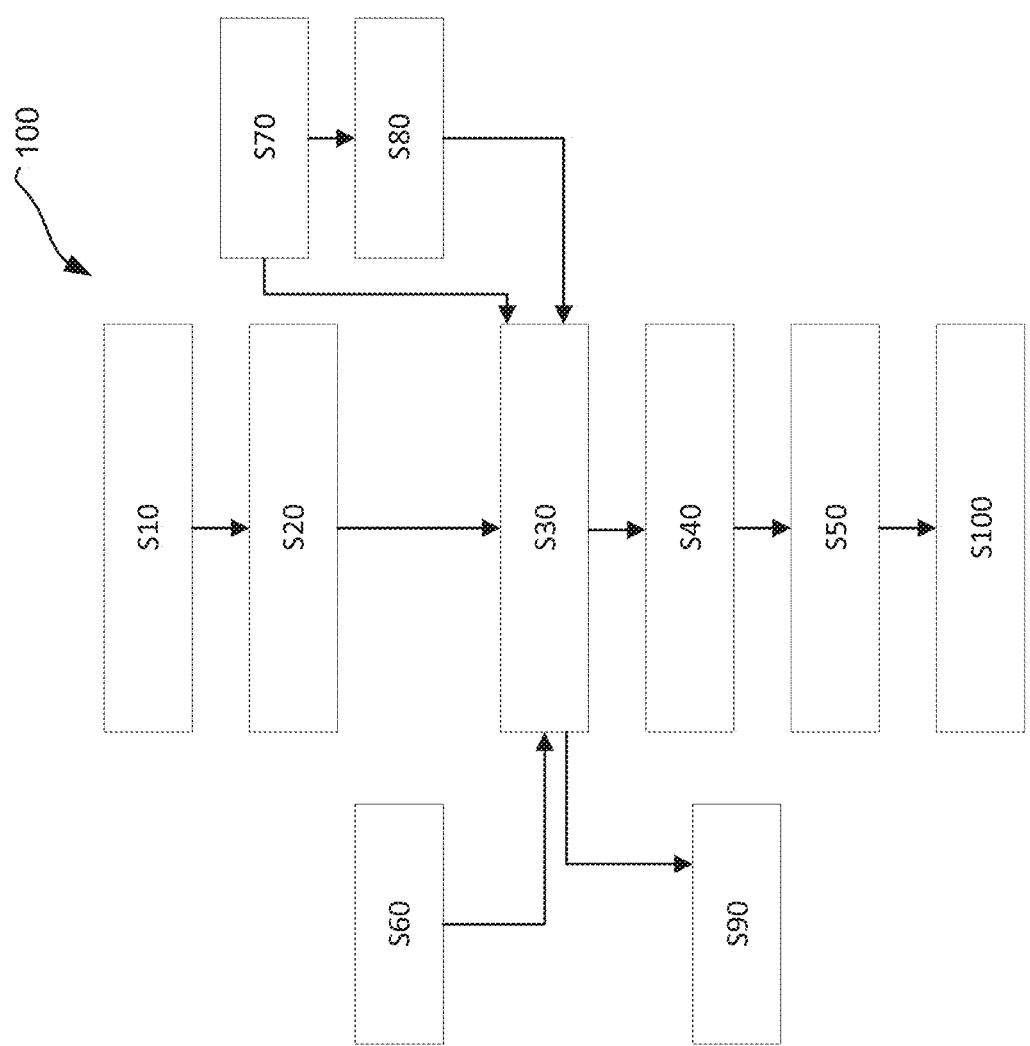
FIG. 3B is a flow chart of an exemplary method to provide visual information in a vehicle according to one example.

FIG. 3B is a flow chart of a method 100 to provide visual information in a vehicle 1 according to a more detailed example. The method comprises determining S10 an actual width CW of a vehicle 1, and optionally also an actual length CL of the same vehicle. The method 100 also comprises receiving S20 map data MD representing characteristics of a road ahead of the vehicle 1.

The method 100 comprises determining S30 a suggested trajectory of the vehicle 1 based on at least the map data MD, optionally also based on an actual vehicle speed VS and the actual vehicle length VL. Alternately, or in combination, the suggested trajectory ST for the vehicle 1 is determined in real-time based on at least the actual vehicle speed VS, the image data ID, and a current steering wheel angle SWA, a current trailer angle TA, and/or a current yaw rate YR.

The method 100 further comprises determining S40 a maximum width MW of the vehicle 1 in real-time based on at least the actual vehicle width CW and the map data MD. Alternately, or in combination, the maximum width MW of the vehicle 1 is determined based on at least the suggested trajectory ST and a current steering wheel angle SWA, a current trailer angle TA, and/or a current yaw rate YR. The maximum width MW of the vehicle 1 may represent the maximum lateral extension of the vehicle 1 along the trajectory ST.

The method 100 further comprises providing S50 visual information VI representing the maximum width MW, and optionally also the trajectory ST, to a driver of the vehicle 1.

Additionally, the method 100 comprises determining S60 an actual vehicle speed VS, that forms input for determining S30 the suggested trajectory ST of the vehicle.

Additionally the method 100 comprises capturing S70 image data ID representing real-time characteristics of the road ahead of the vehicle 1, optionally as well as real-time information of the vehicle's 1 position on the road. The image data ID may form input for determining S30 the suggested trajectory ST of the vehicle.

Additionally, the method 100 comprises determining S80 obstacle information OI from the image data ID, the obstacle information OI representing a presence of an obstacle on the road ahead of the vehicle 1. The obstacle information OI may form input for determining S30 the suggested trajectory ST of the vehicle.

Additionally, the method 100 comprises applying S90 dynamic steering of the vehicle 1, based on the suggested trajectory ST of the vehicle.

The method 100 further comprises presenting S100 the visual information VI representing the maximum width MW of the vehicle 1, optionally also representing the suggested trajectory ST, by projected lights PL on the road ahead of the vehicle 1, and/or on a head-up display HUD of the vehicle 1.

Now turning to FIGS. 4A, 4B, and 4C some examples of the method 100 in operation will be described. Starting in FIG. 4A a vehicle 1 is travelling on a road R, having a vehicle speed VS. The vehicle 1 has an actual total vehicle length CL and an actual total vehicle width CW. The vehicle 1, as an example, is a truck 1 comprising a tractor unit 3 and a trailer 5 being pulled by the tractor unit 3.

In the shown example the road R is straight. The vehicle 1 is equipped with a control system 10 as discussed above with reference to FIG. 2, configured to determine a maximum width MW of the vehicle 1. The maximum width MW may be the actual width of the vehicle 1, or a predictive width representing the maximum width MW along the road R ahead of the vehicle 1. In the shown example the maximum width MW is presented to the driver as the transverse distance between a left indicator LI and a right indicator RI. The maximum width MW is preferably defined in a direction being parallel with the left-to-right direction of the tractor unit 3 i.e., perpendicular to a heading direction of the tractor unit 3. The maximum width MW of the vehicle 1 may be presented to the driver in a number of ways, as further will be described with reference to FIG. 6 and FIG. 7.

The maximum width MW may be an actual value of the current position of the vehicle 1, or a predictive value based on an expected trajectory of the vehicle 1.

In the example of FIG. 4A, as the road R ahead of the vehicle 1 is straight, the vehicle 1 is expected to travel straight ahead. The maximum width MW will be the same as the actual width CW of the vehicle 1. This applies for the maximum width MW being an actual value of the current position of the vehicle 1, or when defining a predictive value based on the expected (i.e., straight) trajectory of the vehicle 1.

The control system 10 is further configured to determine a suggested trajectory ST for the vehicle 1. The suggested trajectory ST is in this example presented to the driver as a straight line ahead of the vehicle 1.

The maximum width MW of the vehicle 1 may be determined based on the suggested trajectory ST. In such embodiment the left indicator LI will be arranged to the left of the suggested trajectory ST, while the right indicator RI is arranged to the right of the suggested trajectory ST. When the suggested trajectory ST points straight ahead, and when the vehicle 1 is travelling straight ahead on the road R, the left and right indicators LI, RI are arranged symmetrically on respective sides of the suggested trajectory ST.

Another driving situation is shown in FIG. 4B. Here the vehicle 1 is approaching a 90° turn. The vehicle 1 is travelling straight towards the turn on a road R, having a vehicle speed VS. The vehicle 1 has an actual total vehicle length CL and an actual total vehicle width CW. The vehicle 1, as an example, is a truck 1 comprising a tractor unit 3 and a trailer 5 being pulled by the tractor unit 3.

The control system 10 is configured to determine a maximum width MW of the vehicle 1. In the shown example the maximum width MW is presented to the driver as the transverse distance between a left indicator LI and a right indicator RI.

In a first example, as shown in FIG. 4B, the maximum width MW is the maximum width MW of the vehicle 1 in its actual position. As the vehicle 1 is still travelling straight ahead before entering the turn, the maximum width MW is equal to the actual total vehicle width CW.

Figure 4C:
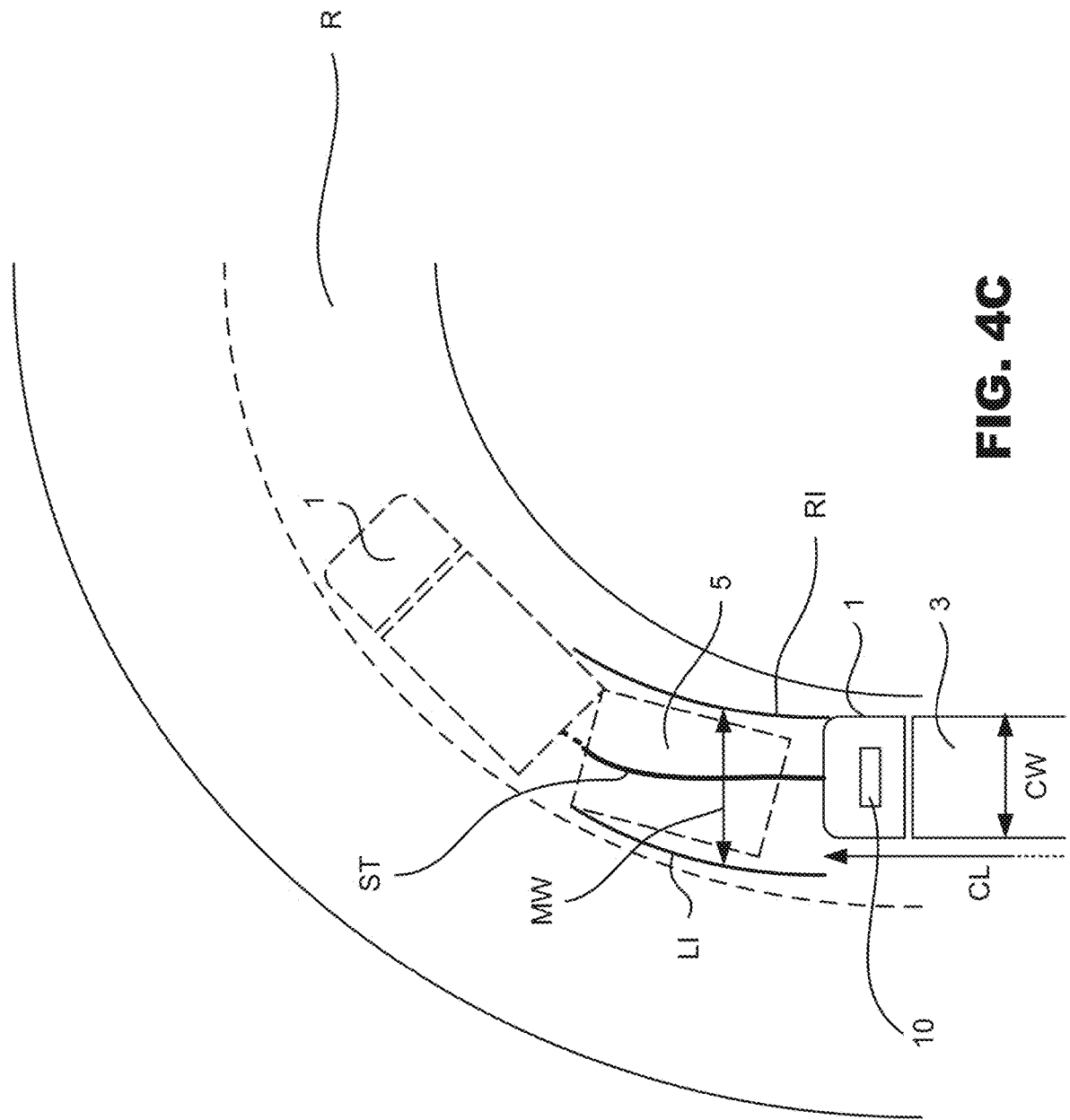

In another example, as shown in FIG. 4C, the maximum width is the maximum width MW along an expected trajectory, i.e., along the curve.

In such example the control system 10 is further configured to determine a suggested trajectory ST for the vehicle 1. The suggested trajectory ST is in this example presented to the driver as a curved line ahead of the vehicle 1, as the vehicle 1 will benefit from moving towards the center of the road R in order to take the curve more smoothly.

As the road R ahead of the vehicle 1 is curved, the vehicle 1 is expected to turn by following the curved suggested trajectory ST. This will cause some off-tracking to occur, i.e. the rear axle(s) of the vehicle 1 will not follow the same path as the front axle of the vehicle 1. Hence, the maximum width MW during the turn will not be the same as the actual width CW of the vehicle 1 as the vehicle 1 runs along the suggested trajectory.

In FIG. 4C the vehicle 1 is indicated by dashed lines further down the curve. As can be seen, the trailer 5 will be angled relative the tractor unit 3 thereby increasing the maximum width MW of the vehicle 1. The left indicator LI of the maximum width MW will correspond to the leftmost position of the vehicle 1 while travelling along the curve, while the right indicator RI of the maximum width MW of the vehicle will correspond to the rightmost position of the vehicle 1 while travelling along the curve.

By presenting the maximum width MW as a predictive value to the driver, it is possible to predict, and avoid, a potential collision along the way. The maximum width MW, when predicted, can be presented in a number of ways. For example, the maximum width MW may be a maximum width trajectory MWT as is further explained with reference to FIGS. 5A-5C, i.e. a predictive indication of how the maximum width MW will change as the vehicle 1 moves along its expected trajectory. In another example, as indicated in FIG. 4C, the maximum width MW may be indicated only as a single width representing the maximum lateral extension of the vehicle 1 during the expected trajectory. Preferably, in order to provide a reasonable reference for the driver, the maximum width MW is presented as an extension in parallel with the left-to-right direction of the tractor unit 3 i.e., perpendicular to a heading direction of the tractor unit 3.

For all examples described so far, the maximum width MW of the vehicle 1 is preferably determined continuously and in real-time, such that the visual information representing the maximum width MW is continuously updated to the driver.

The maximum width MW is, as explained above, either an indication of the actual maximum width based on the current position of the vehicle 1, or an indication of the vehicle's 1 position on the road along a specific distance ahead of the vehicle 1 when assuming an assumed route which preferably coincides with the suggested trajectory ST. This specific distance may be a preset parameter, or it may be dynamic. For example, if the vehicle 1 is approaching a corner leaving the road R ahead of the corner turn invisible for the driver, the specific distance may correspond to the visible part of the road R ahead of the vehicle. In other examples the specific distance may be e.g., 10 meters.

Figure 5C:
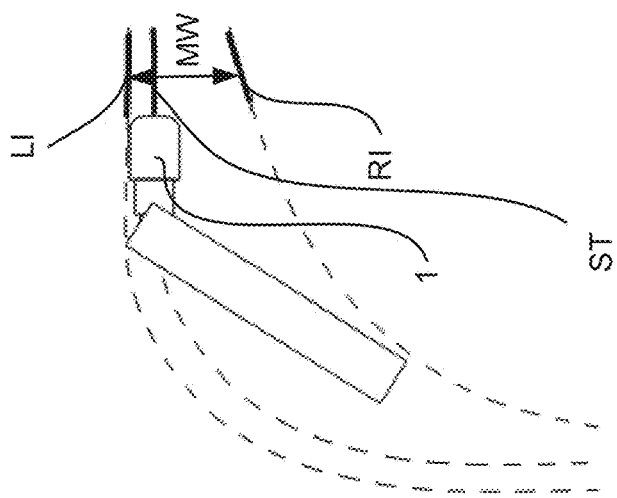
FIGS. 5A-5C are top views of an exemplary traffic situation sequence for a vehicle according to an example.
Figure 5B:
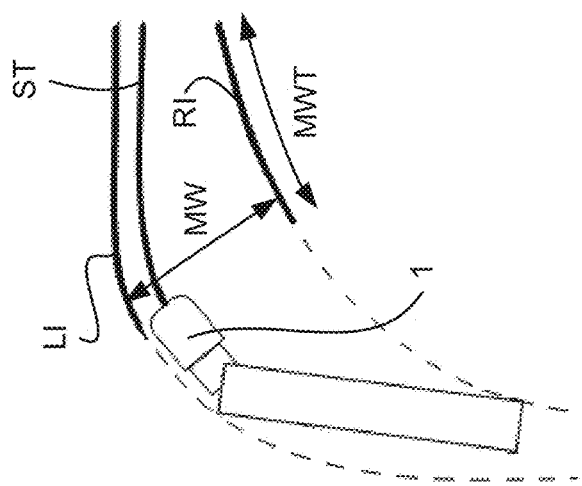
Figure 5A:
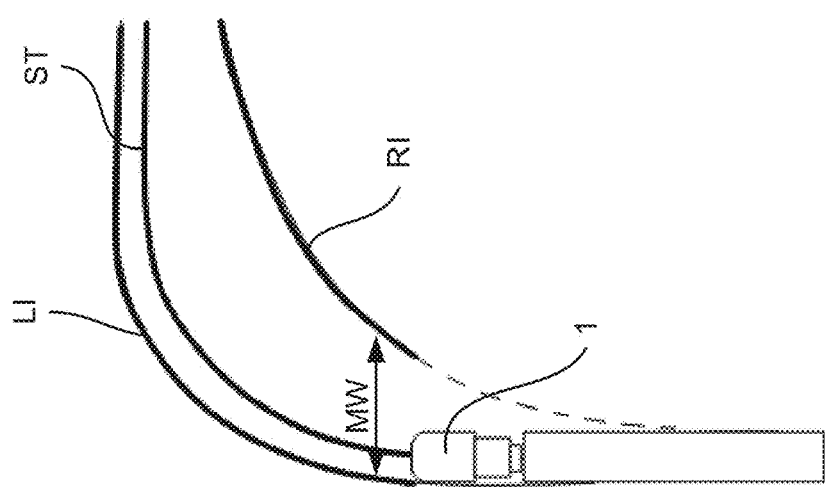

Now turning to FIGS. 5A-5C, another example is shown. In FIG. 5A the vehicle 1 is driving towards a curve. The control system 10 is operating to determine a suggested trajectory ST based on one or more parameters as will be further described below, including determining a suggested trajectory based on the maximum width MW. The control system 10 is further operating to determine a maximum width MW of the vehicle along the curve. The maximum width MW may be determined based on the suggested trajectory ST, i.e., the maximum width MW is the maximum width MW of the vehicle 1 as it follows the suggested trajectory. Optionally, the suggested trajectory ST may be determined based on the maximum width MW; for such embodiment a number of possible maximum widths MW may be determined for different trajectories, and the suggested trajectory ST may be determined based on the minimum maximum width MW. In a specific example the maximum width MW is indicating a collision to occur, e.g. by receiving obstacle information OI indicating that the vehicle 1 will hit an obstacle further down the road R due to off-tracking. Based on such identification, a suggested trajectory ST may be determined resulting in an updated maximum width MW providing clearance to the identified obstacle.

The maximum width MW may be determined as a maximum width trajectory MWT. The maximum width trajectory MWT may represent the maximum width MW at different positions of the vehicle 1 along the route. As is shown in FIG. 5A, showing an example where the maximum width MW is predictive information, the maximum width MW is actually a series of values along the route, while the maximum width trajectory MWT is the total number of values of the maximum width MWT. In FIG. 5A the maximum width trajectory MWT represents the distance between the solid lines of the left indicator LI and the right indicator RI, which form the boundaries of the maximum width MW.

As the vehicle 1 proceeds along the route, the maximum width MW will be continuously updated. In FIG. 5B the vehicle 1 has entered the curve and the trailer 5 is subject to off-tracking, thereby increasing the maximum width MW of the vehicle 1. For the road ahead of the vehicle 1, the maximum width MW is presented to the driver.

In FIG. 5C the vehicle 1 is about to exit the curve, while off-tracking is still causing the maximum width MW to be substantially greater than the actual width CW of the vehicle 1. The maximum width MW is updated accordingly, as illustrated by the solid lines representing the left indicator LI and the right indicator RI.

The idea of determining the maximum width MW of the vehicle 1 and to present that information to the driver has proven to provide great advantages in maneuvering situations, or when driving on a narrow road.

In the most simple form, the maximum width MW is the total width of the vehicle 1 in its current position. Alternatively, the maximum width MW is a predictive parameter indicating a future maximum width MW of the vehicle 1, or even a parameter indicating how the future maximum width MW of the vehicle 1 will change during the expected trajectory. The expected trajectory may preferably be the suggested trajectory ST. The predicted maximum width MW may be determined by fetching map data MD. By determining characteristics of the road ahead of the vehicle 1 from the map data MD it is possible to extract relevant information, such as an assumed right turn at an upcoming intersection.

By also knowing the actual width CW of the vehicle 1 the maximum width MW can be determined for the upcoming right turn.

There are many available options for determining the maximum width MW. One known concept that could be implemented for the examples described herein and referring to a low speed 90° turn determines a maximum lateral distance between the steering axle and the rearmost axle of the vehicle without considering specific vehicle dynamics. The lateral distance between the center of the steering axle and the center of the rearmost axle may be determined by the following formula:

$$\Delta = R_r \cdot \left( \frac{1}{\cos(\delta_f)} - 1 \right),$$

where $\Delta$ represents the maximum lateral distance during the turn, $R_r$ represents the turning radius of the rearmost axle which parameter may be accessed from the map data, for example by assuming that the rearmost axle will follow the innermost radius of the turn, and $\delta_\zeta$ represents the circumferential angle between the steering axle and the rearmost axle which parameter may be estimated from the actual length CL of the vehicle 1 and the radius of the turn (accessible from the map data MD).

From the determined maximum lateral distance $\Delta$ between the center of the steering axle and the center of the rearmost axle it may be possible to determine the maximum width MW of the vehicle 1 by adding half the actual width CW of the vehicle 1 to the left of the center of the steering axle, and half the actual width CW of the vehicle 1 plus $\Delta$ to the right of the center of the steering axle.

From the above example, the maximum width trajectory MWT can be determined as a continuous function starting from an initial position of the vehicle 1. The initial position may e.g., be a position prior to entering the curve, i.e., when the maximum width MW typically equals the actual width CW. The maximum width trajectory MWT can then be extrapolated from the maximum width MW at the initial position, to an estimated position in the turn. The maximum width MW at the estimated position may for example be determined using the above formula, or any other available method or model.

The above example is one option only, and other algorithms and models exist which may provide more or less accurate estimations of the maximum width MW of the vehicle 1 as it follows a certain trajectory. For such algorithms and models, various vehicle parameters may be used except for the ones mentioned herein.

Preferably sensor fusion is implemented for determining the maximum width MW. For example, the vehicle 1 may be equipped with one or more cameras as well as one or more radar sensors. This equipment can be used to detect the total length of the vehicle 1, which is required in order to determine the maximum width MW as described above.

Figure 6:
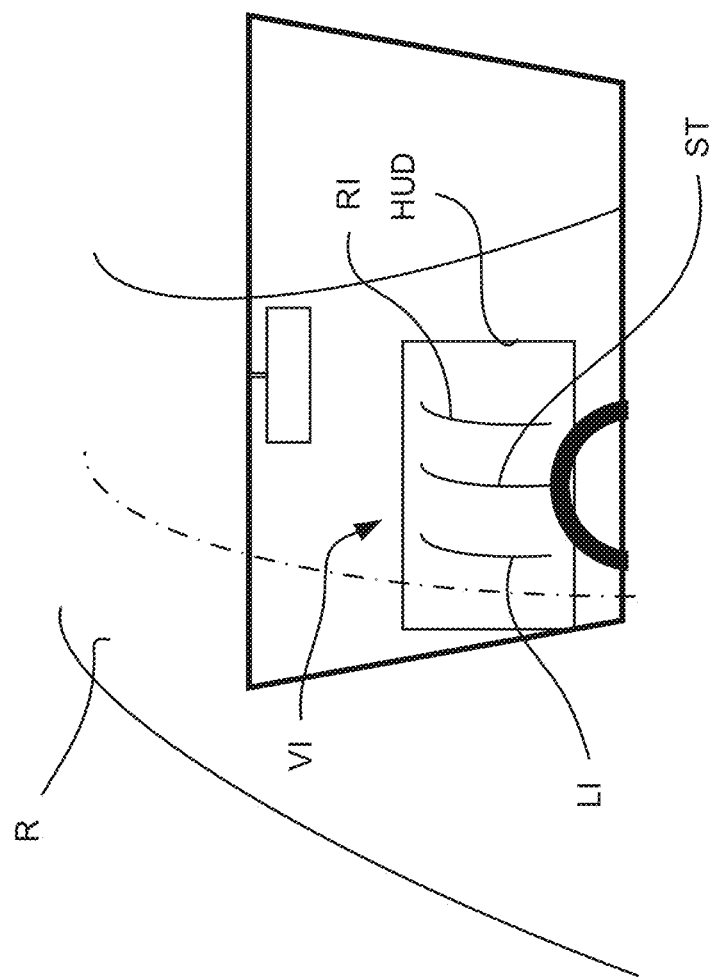
FIG. 6 is an exemplary driver's view of a vehicle according to an example.

In FIG. 6 an example is shown where the maximum width MW, and optionally the suggested trajectory ST, is presented as visual information VI to the driver via a head-up display HUD incorporated in the vehicle 1.

Figure 7:
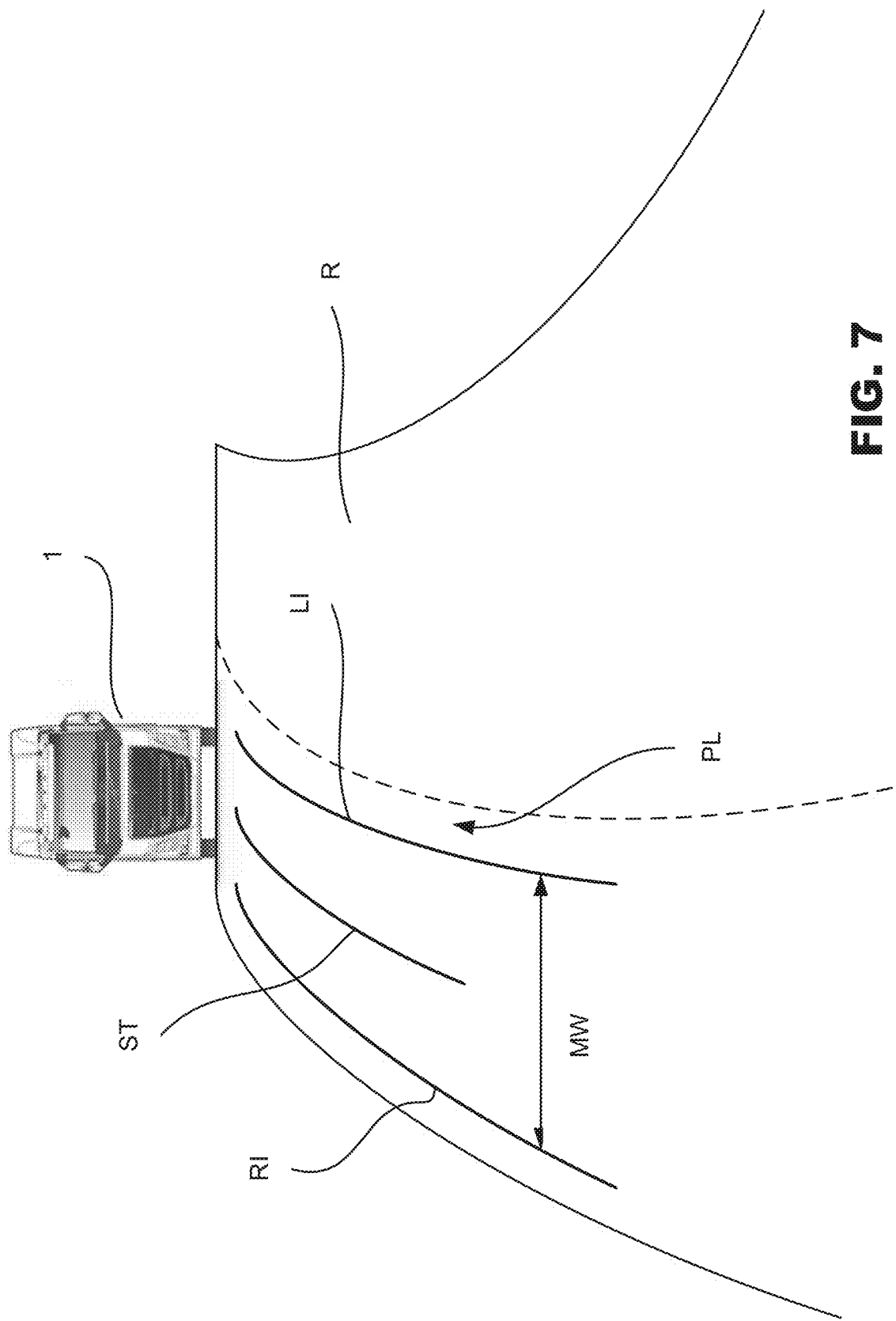
FIG. 7 is an exemplary view of a vehicle according to an example.

In FIG. 7 another example is shown where the maximum width MW, and optionally the suggested trajectory ST, is presented as visual information VI to the driver via projected exterior lights PL, illuminating the road ahead of the vehicle.

Figure 8:
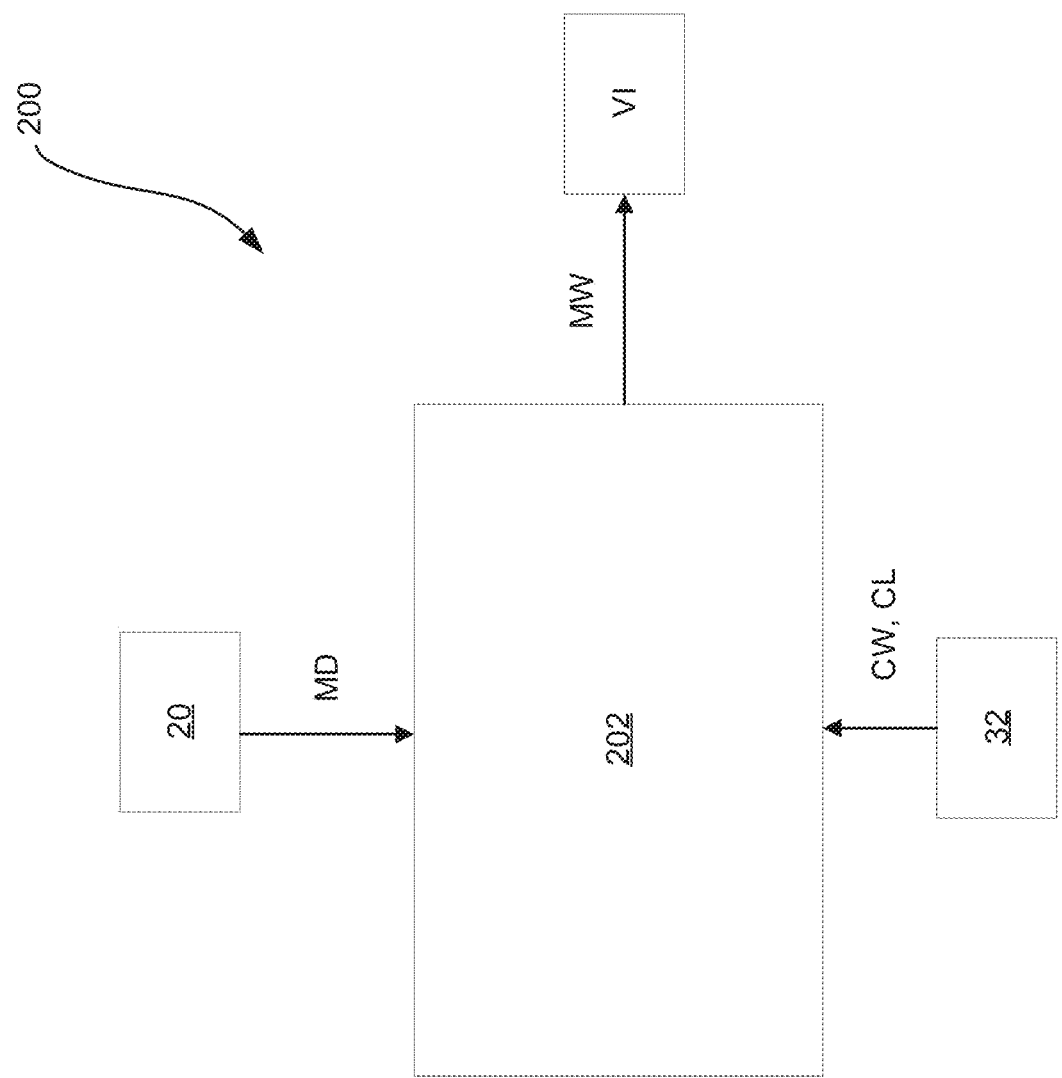
FIG. 8 is another exemplary system diagram of a vehicle according to an example.

FIG. 8 is another view of FIG. 2, according to another example. A processor device 202 is forming part of a computer system 200 of a vehicle 1. As mentioned previously the processor device 202 may represent one or more control units 12, and the computer system 200 may represent a control system 10. The processor device 202 is configured to receiving map data MD representing characteristics of a road R ahead of a vehicle 1. The vehicle has an actual vehicle width CW and an actual vehicle length CL.

The processor device 202 is further configured to determine a maximum width MW of the vehicle 1 based on at least the actual vehicle width CW and the map data MD.

The processor device 202 is further configured to provide visual information VI representing the maximum width MW to a driver of the vehicle 1.

Figure 9:
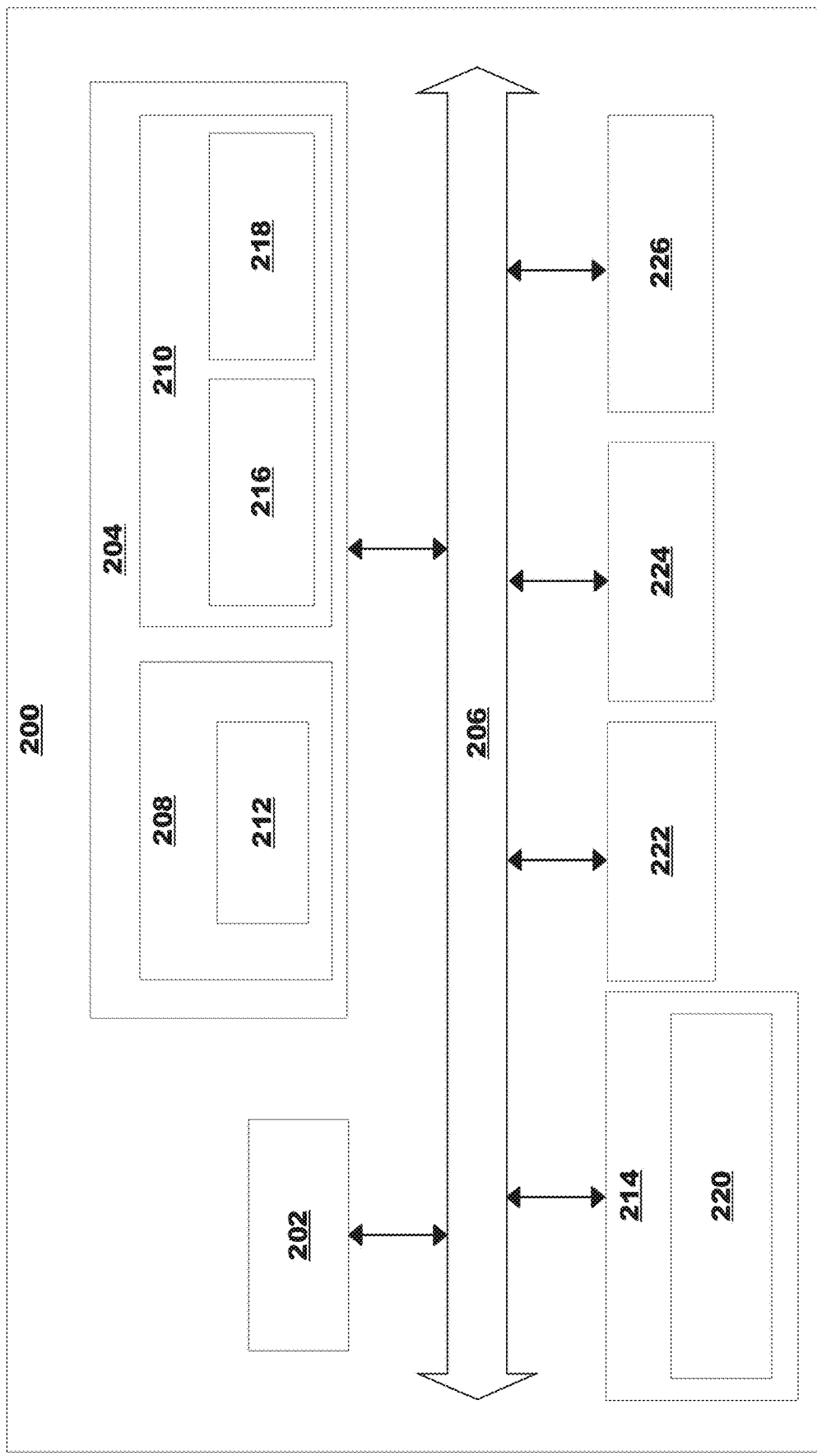
FIG. 9 is a schematic diagram of an exemplary computer system for implementing examples disclosed herein, according to one example.

FIG. 9 is a schematic diagram of a computer system 200 for implementing examples disclosed herein. The computer system 200 is adapted to execute instructions from a computer-readable medium to perform these and/or any of the functions or processing described herein. The computer system 200 may be connected (e.g., networked) to other machines in a LAN, an intranet, an extranet, or the Internet. While only a single device is illustrated, the computer system 200 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 200 may comprise at least one computing device or electronic device capable of including firmware, hardware, and/or executing software instructions to implement the functionality described herein. The computer system 200 may include a processor device 202 (may also be referred to as a control unit), a memory 204, and a system bus 206. The computer system 200 may include at least one computing device having the processor device 202. The system bus 206 provides an interface for system components including, but not limited to, the memory 204 and the processor device 202. The processor device 202 may include any number of hardware components for conducting data or signal processing or for executing computer code stored in memory 204. The processor device 202 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 206 may be any of several types of bus structures that may further interconnect to a memory bus (with or without a memory controller), a peripheral bus, and/or a local bus using any of a variety of bus architectures. The memory 204 may be one or more devices for storing data and/or computer code for completing or facilitating methods described herein. The memory 204 may include database components, object code components, script components, or other types of information structure for supporting the various activities herein. Any distributed or local memory device may be utilized with the systems and methods of this description. The memory 204 may be communicably connected to the processor device 202 (e.g., via a circuit or any other wired, wireless, or network connection) and may include computer code for executing one or more processes described herein. The memory 204 may include non-volatile memory 208 (e.g., read-only memory (ROM), erasable programmable read-only memory (EPROM), electrically erasable programmable read-only memory (EEPROM), etc.), and volatile memory 210 (e.g., random-access memory (RAM)), or any other medium which can be used to carry or store desired program code in the form of machine-executable instructions or data structures and which can be accessed by a computer or other machine with a processor device 202. A basic input/output system (BIOS) 212 may be stored in the non-volatile memory 208 and can include the basic routines that help to transfer information between elements within the computer system 200.

The computer system 200 may further include or be coupled to a non-transitory computer-readable storage medium such as the storage device 214, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 214 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 214 and/or in the volatile memory 210, which may include an operating system 216 and/or one or more program modules 218. All or a portion of the examples disclosed herein may be implemented as a computer program product 220 stored on a transitory or non-transitory computer-usable or computer-readable storage medium (e.g., single medium or multiple media), such as the storage device 214, which includes complex programming instructions (e.g., complex computer-readable program code) to cause the processor device 202 to carry out the steps described herein. Thus, the computer-readable program code can comprise software instructions for implementing the functionality of the examples described herein when executed by the processor device 202. The processor device 202 may serve as a controller or control system for the computer system 200 that is to implement the functionality described herein.

The computer system 200 also may include an input device interface 222 (e.g., input device interface and/or output device interface). The input device interface 222 may be configured to receive input and selections to be communicated to the computer system 200 when executing instructions, such as from a keyboard, mouse, touch-sensitive surface, etc. Such input devices may be connected to the processor device 202 through the input device interface 222 coupled to the system bus 206 but can be connected through other interfaces such as a parallel port, an Institute of Electrical and Electronic Engineers (IEEE) 1394 serial port, a Universal Serial Bus (USB) port, an IR interface, and the like. The computer system 200 may include an output device interface 224 configured to forward output, such as to a display, a video display unit (e.g., a liquid crystal display (LCD) or a cathode ray tube (CRT)). The computer system 200 may also include a communications interface 226 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A computer system comprising a processor device configured to:
   receive map data representing characteristics of a road ahead of a vehicle, the vehicle having an actual vehicle width and an actual vehicle length;
   determine a trajectory for the vehicle;
   determine a maximum width of the vehicle based on at least the actual vehicle width, the map data, and the trajectory;
   provide visual information representing the maximum width to a driver of the vehicle; and
   apply dynamic steering of the vehicle based on the trajectory.

2. A computer-implemented method, comprising:
   receiving, by a processor device, map data representing characteristics of a road ahead of the vehicle, the vehicle having an actual vehicle width and an actual vehicle length;
   determine a trajectory for the vehicle;
   determining, by the processor device, a maximum width of the vehicle based on at least the actual vehicle width, the map data, and the trajectory;
   providing, by the processor device, visual information representing the maximum width to a driver of the vehicle; and
   applying dynamic steering of the vehicle based on the trajectory.

3. The method of claim 2, further comprising:
   determining the maximum width of the vehicle as the maximum lateral extension of the vehicle along the trajectory.

4. The method of claim 2, further comprising:
   providing visual information representing the trajectory to a driver of the vehicle.

5. The method of claim 2, wherein:
   the trajectory and/or the maximum width of the vehicle is determined in real-time.

6. The method of claim 2, further comprising:
   determining an actual vehicle speed, and wherein determining the trajectory and/or the maximum width is further based on the actual vehicle speed.

7. The method of claim 2, further comprising:
   capturing image data representing real-time characteristics of the road ahead of the vehicle; and
   determining the trajectory for the vehicle based on the image data.

8. The method of claim 7, wherein:
   the image data represents real-time information of the vehicle's position on the road; and
   further comprising:
   determining the trajectory for the vehicle based on the image data.

9. The method of claim 7, further comprising:

determining obstacle information from the image data, the obstacle information representing a presence of an obstacle on the road ahead of the vehicle; and determining the trajectory for the vehicle based on the obstacle information.

10. The method of claim 2, further comprising:

determining the maximum width of the vehicle and/or the trajectory based on a current steering wheel angle, a current trailer angle, and/or a current yaw rate.

11. The method of claim 2, further comprising:

providing visual information representing the maximum width as a left indicator representing the left-most position of the vehicle, and a right indicator representing the right-most position of the vehicle.

12. The method of claim 2, further comprising:

providing visual information representing the maximum width as a maximum width trajectory extending along the trajectory.

13. The method of claim 2, further comprising:

presenting the visual information by projected light on the ahead road, and/or on a vehicle head-up display.

14. The method of claim 2, further comprising:

determining, by the processor device, an actual vehicle speed;

capturing image data representing real-time characteristics of the road ahead of the vehicle and real-time information of the vehicle's position on the road;

determining, by the processor device, a trajectory for the vehicle in real-time based on the actual vehicle speed, the image data, and a current steering wheel angle, a current trailer angle, and/or a current yaw rate;

determining, by the processor device, the maximum width of the vehicle in real-time based on the trajectory, and a current steering wheel angle, a current trailer angle, and/or a current yaw rate, wherein the maximum width of the vehicle represents the maximum lateral extension of the vehicle along the trajectory; and providing, by the processor device, visual information representing the trajectory to a driver of the vehicle.

15. A vehicle comprising a processor device to perform the method of claim 2.

16. A computer program product comprising program code for performing, when executed by a processor device, the method of claim 2.

17. A control system comprising one or more control units configured to perform the method of claim 2.

18. A non-transitory computer-readable storage medium comprising instructions, which when executed by a processor device, cause the processor device to perform the method of claim 2.

* * * * *